Jan. 30, 1945.    M. A. EDWARDS    2,368,456
POWER SYSTEM
Filed Jan. 3, 1944

Inventor:
Martin A. Edwards,
by Harry E. Dunham
His Attorney.

Patented Jan. 30, 1945

2,368,456

UNITED STATES PATENT OFFICE 2,368,456

POWER SYSTEM

Martin A. Edwards, Scotia, N. Y., assignor to General Electric Company, a corporation of New York Application January 3, 1944, Serial No. 516,870

6 Claims. (Cl. 290—17)

My invention relaes to power systems and in particular to an engine generator system for supplying power to driving motors such as are used with self-propelled vehicles.

An object of my invention is to provide an improved power system for maintaining the load on a prime mover at its most efficient operating value.

Another object of my invention is to provide an improved engine-generator power system provided with an excitation system for the generator for maintaining a substantially constant power load on the engine above a predetermined generator load current.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 1:
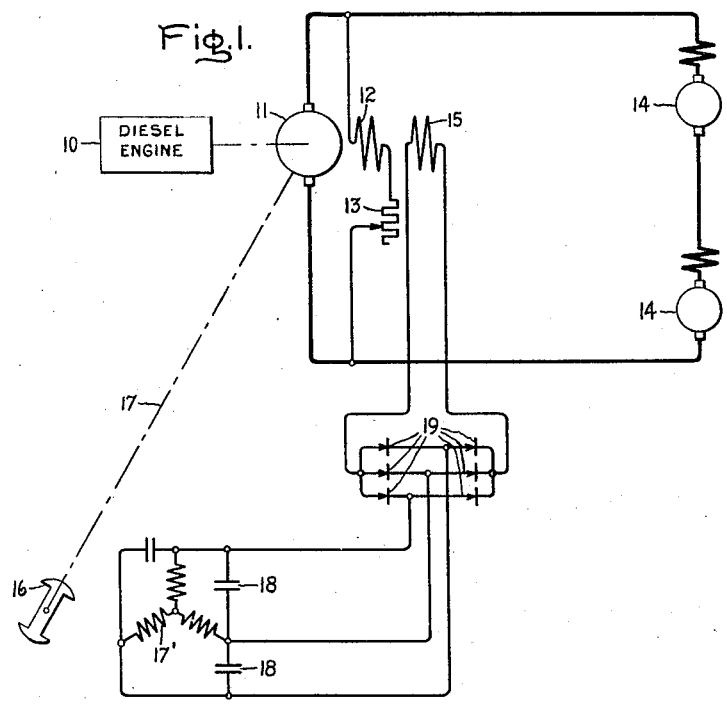
Figure 2:
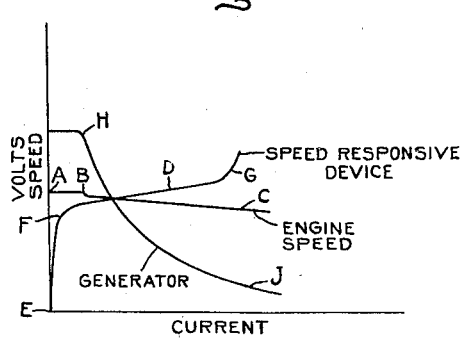

In the drawing, Fig. 1 is a schematic diagram illustrating an embodiment of my improved power system; and Fig. 2 is a graph illustrating characteristics of different parts of the power system shown in Fig. 1.

Referring to the drawing, I have shown a prime mover 10, such as a Diesel engine, arranged to drive a main generator having an armature 11 and a main shunt field exciting winding 12 connected across the terminals of the armature 11 through a control rheostat 13. The main generator is adapted to supply power to a load including series driving motors 14, such as are used for supplying power to a self-propelled vehicle. Prime movers of this type are generally provided with governors, and the Diesel engine shown in Fig. 1 is adapted to be provided with any suitable conventional governor for maintaining the speed of the engine substantially constant up to a predetermined maximum load on the engine. This is indicated by the curve AB in Fig. 2. Beyond this load, the speed of the engine tends to fall off slightly, although the actual horsepower output of the engine remains substantially constant. This operation is indicated in Fig. 2 by the curve BC. It is desirable that the load on the generator should not tend to exceed the capacity of the engine, as otherwise it would cause the engine to stall, and it is also desirable that the load imposed on the engine by the electrical power system should be such that the output of the generator plus its losses should remain substantially constant and equal to the maximum output of the prime mover and, therefore, equal to its most efficient operating load. In order to obtain such an operating characteristic, I provide a second field exciting winding 15 on the main generator which is adapted to be excited to provide a cumulative component of excitation to the main generator adapted to vary the total excitation of the main generator to vary the voltage thereof and maintain a substantially constant power load on the prime mover above a predetermined load value for all variations in the generator load current. This is obtained by energizing the second field exciting winding 15 from an alternating current speed-responsive generator arranged to be driven at a speed responsive to the speed of the main generator and having a rotatable member 16 of magnetic material mechanically connected by a shaft 17 to the armature 11 of the main generator. This speed-responsive generator is provided with a three-phase alternating current armature winding 17, across the terminals of each phase of which an electrical capacitance 18 is connected which is tuned to the inductance of the armature winding 17 for providing a leading current excitation to the A.-C. armature winding above a predetermined speed of the speed-responsive generator which is responsive to the speed thereof. The characteristic of this generator is indicated in Fig. 2 by the curve D in which the energizing current of the field exciting winding 15 is plotted against the speed of the system. Since the load on the speed-responsive device is made up principally of this field exciting winding, this curve is essentially the same as the speed-voltage characteristics of the device which shows that from E to F the speed-responsive generator does not build up appreciably and that above the point F, the voltage in the armature 17 increases very rapidly to the point G and then falls off due to saturation of the iron in the magnetic circuit of the machine. The portion of the curve from F to G is substantially responsive to the speed of the generator and varies considerably for very small changes in the speed if the machine. The voltage of the armature 17 is rectified by rectifiers 18 and is arranged to energize the second field exciting winding 15 which is connected across the rectifiers 19, such that for small variations in the speed of the engine along the portion of the engine characteristic BC and, therefore, of the speed of the main generator armature 11 and of the speed-responsive generator, relatively large variations occur in the output current of the A.-C.

armature 17. This current is the energizing current of the field exciting winding 15 and, therefore, the energization of the field exciting winding 15 and the cumulative component of excitation provided thereby varies substantially directly with variations in the speed of the main generator and of the prime mover, such that the voltage of the main generator armature 11 varies with the engine speed and as an inverse function of the generator load current to maintain a substantially constant power load on the engine. The generator characteristic obtained during this operation of the speed-responsive generator is represented in Fig. 2 by the portion of the generator characteristic curve HJ. Thus, the power load on the prime mover is maintained substantially constant by the generator and its excitation system for substantially all variations of the generator load current above the predetermined value indicated by the point H on the generator voltage-current characteristic curve, and the engine is operated at substantially its maximum efficiency over the major portion of its operating range.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A power system including a prime mover, a main generator arranged to be driven by said prime mover, means for governing the speed of said prime mover to a substantially constant value to rated capacity of said main generator, a load connected to said main generator, a shunt field exciting winding for said main generator, a second field exciting winding for said main generator, a speed responsive generator arranged to be driven at a speed responsive to the speed of said main generator and having an alternating current armature winding, and means for rectifying the current from said A.-C. armature winding and for supplying current to said main generator second field exciting winding to provide a cumulative component of excitation to said main generator adapted to vary the excitation of said main generator to vary the voltage thereof and maintain a substantially constant power load on said prime mover above a predetermined value thereof with variations in generator current.

2. A power system including a prime mover having a substantially constant torque, means for governing the speed of said prime mover to a substantially constant value, a main generator arranged to be driven by said prime mover, a load connected to said main generator, a shunt field exciting winding for said main generator, a second field exciting winding for said main generator, a speed responsive generator arranged to be driven at a speed responsive to the speed of said main generator and having a rotatable member of magnetic material and an alternating current stationary armature winding, means including an electrical capacitance connected across said A.-C. armature winding tuned to the inductance of said A.-C. armature winding for providing a leading current excitation to said A.-C. armature winding above a predetermined speed of said speed responsive generator, and means for rectifying the current from said A.-C. armature winding and for supplying current to said main generator second field exciting winding to provide a cumulative component of excitation to said main generator.

3. A power system including a prime mover, a main generator arranged to be driven by said prime mover, means for governing the speed of said prime mover to a substantially constant value to rated capacity of said main generator, a load connected to said main generator, a shunt field exciting winding for said main generator, a second field exciting winding for said main generator, a speed responsive generator arranged to be driven at a speed responsive to the speed of said main generator and having an alternating current armature winding, means including an electrical capacitance connected to said A.-C. armature winding for providing excitation to said A.-C. armature winding above a predetermined speed of said speed responsive generator responsive to the speed thereof, and means for rectifying the current from said A.-C. armature winding and for supplying current to said main generator second field exciting winding to provide a cumulative component of excitation to said main generator adapted to vary the excitation of said main generator to vary the voltage thereof and maintain a substantially constant power load on said prime mover above a predetermined value thereof with variations in generator current.

4. A power system including a prime mover having a substantially constant torque, a main generator arranged to be driven by said prime mover, means for governing the speed of said prime mover to a substantially constant value to rated capacity of said main generator, a load connected to said main generator, a main field exciting winding for said main generator, a second field exciting winding for said main generator, a speed responsive generator arranged to be driven at a speed responsive to the speed of said main generator and having an alternating current three phase armature winding, means including an electrical capacitance connected to each phase of said A.-C. armature winding for providing excitation to said A.-C. armature winding above a predetermined speed of said responsive generator responsive to the speed thereof, and means for rectifying the current from said A.-C. armature winding and for supplying current to said main generator second field exciting winding to provide a cumulative component of excitation to said main generator adapted to vary the excitation of said main generator to vary the voltage thereof and maintain a substantially constant power load on said prime mover above a predetermined value thereof with variations in generator current.

5. A power system including a prime mover, a main generator arranged to be driven by said prime mover, means for governing the speed of said prime mover to a substantially constant value to rated capacity of said main generator, a load connected to said main generator, a main field exciting winding for said main generator, a second field exciting winding for said main generator, a speed responsive generator arranged to be driven at a speed responsive to the speed of said main generator and having a rotatable member of magnetic material and an alternating current armature winding, means including an electrical capacitance connected across said A.-C. armature winding tuned to the inductance of said A.-C. armature winding for providing a leading current excitation to said A.-C. armature winding above a predetermined speed of said speed responsive generator responsive to the speed thereof, and means for rectifying the current from said A.-C. armature winding and for supplying current to said main generator second field exciting winding to provide a cumulative component of excitation to said main generator adapted to vary the excitation of said main generator to vary the voltage thereof and maintain a substantially constant power load on said prime mover above a predetermined value thereof with variations in generator current.

6. A power system including a prime mover having a substantially constant torque, a main generator arranged to be driven by said prime mover, means for governing the speed of said prime mover to a substantially constant value to rated capacity of said main generator, a load including motors connected to said main generator, a shunt field exciting winding for said main generator, a second field exciting winding for said main generator, a speed responsive generator arranged to be driven at a speed responsive to the speed of said main generator and having a rotatable member of magnetic material and an alternating current three phase armature winding, means including an electrical capacitance connected across each phase of said A.-C. armature winding tuned to the inductance of said A.-C. armature winding for providing a leading current excitation to said A.-C. armature winding above a predetermined speed of said speed responsive generator responsive to the speed thereof, and means for rectifying the current from said A.-C. armature winding and for supplying current to said main generator second field exciting winding to provide a cumulative component of excitation to said main generator adapted to vary the excitation of said main generator to vary the voltage thereof and maintain a substantially constant power load on said prime mover above a predetermined value with variations in generator current.

MARTIN A. EDWARDS.